US012581101B2

(12) United States Patent (10) Patent No.: US 12,581,101 B2
Li et al. (45) Date of Patent: Mar. 17, 2026

(54) TEMPLATE MATCHING REFINEMENT FOR AFFINE MOTION

(71) Applicant: Tencent America LLC, Palo Alto, CA (US)

(72) Inventors: Guichun Li, San Jose, CA (US); Xin Zhao, San Jose, CA (US); Lien-Fei Chen, Hsinchu (TW); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 156 days.

(21) Appl. No.: 18/380,525

(22) Filed: Oct. 16, 2023

(65) Prior Publication Data

US 2024/0137540 A1 Apr. 25, 2024

Related U.S. Application Data

(60) Provisional application No. 63/417,279, filed on Oct. 18, 2022.

(51) Int. Cl.
H04N 19/44 (2014.01)
H04N 19/105 (2014.01)
(Continued)

(52) U.S. Cl.
CPC ........... H04N 19/44 (2014.11); H04N 19/105 (2014.11); H04N 19/137 (2014.11); H04N 19/176 (2014.11)

(58) Field of Classification Search
CPC .... H04N 19/176; H04N 19/52; H04N 19/105; H04N 19/513; H04N 19/70;
(Continued)

(56) References Cited

U.S. PATENT DOCUMENTS 10,397,569 B2 * 8/2019 Liu ...................... H04N 19/593

FOREIGN PATENT DOCUMENTS

CN 109792518 B * 6/2023 ........... H04N 19/139
WO WO-2022221140 A1 * 10/2022 ........... H04N 19/105

OTHER PUBLICATIONS

Jie Chen, et al., Non-EE2: DMVR for affine merge coded blocks, Joint Video Experts Team (JVET) of ITU-T SG 16 WP 3 and ISO/IEC JTC 1/SC 29 27th Meeting, by teleconference, Jul. 13-22, 2022, Document: JVET-AA0144-v2, pp. 1-5.

* cited by examiner

*Primary Examiner* — Masum Billah
(74) *Attorney, Agent, or Firm* — ARENTFOX SCHIFF LLP

(57) ABSTRACT

A current block is coded by an affine mode and includes a first control point at a first corner of the current block. A current template associated with the first control point is determined. A plurality of candidate reference templates is determined in a reference picture for the current template. A reference template is selected from the plurality of candidate reference templates for the current template based on a template matching (TM) cost. The TM cost indicates a respective difference between each candidate reference template and the current template of the first control point. A first control point motion vector (CPMV) is determined based on the selected reference template, where the first CPMV indicates an offset between the selected reference template in the reference picture and the current template associated with the first control point. The current block is reconstructed based at least on the first CPMV.

20 Claims, 13 Drawing Sheets

(51) Int. Cl.
*H04N 19/137* (2014.01)
*H04N 19/176* (2014.01)
(58) Field of Classification Search
CPC .... H04N 19/139; H04N 19/159; H04N 19/54;
H04N 19/137; H04N 19/109
USPC ........................................................ 375/240
See application file for complete search history.

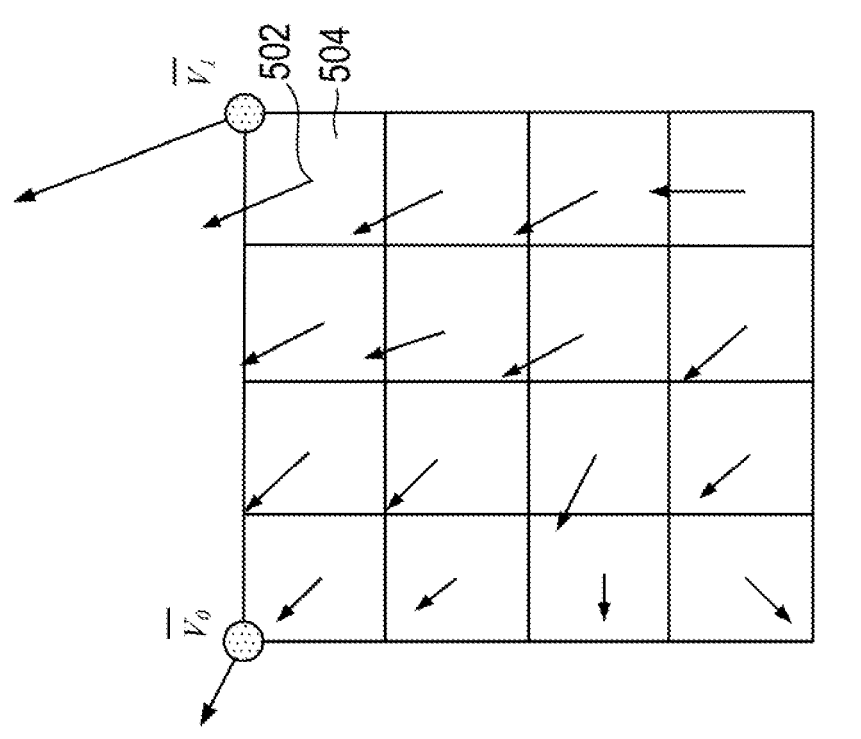
*FIG. 5*

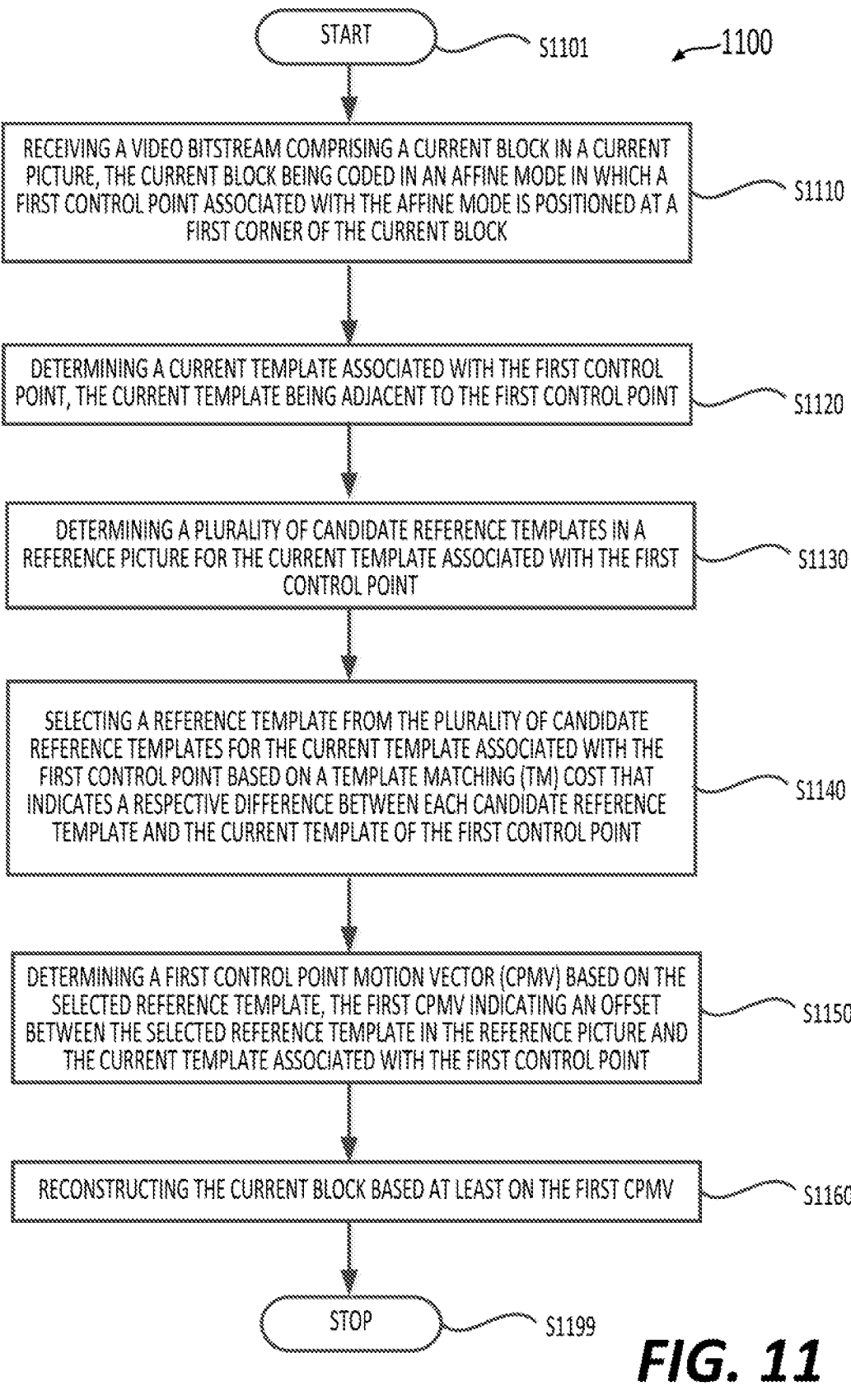

START — S1101

—1100

RECEIVING A VIDEO BITSTREAM COMPRISING A CURRENT BLOCK IN A CURRENT PICTURE, THE CURRENT BLOCK BEING CODED IN AN AFFINE MODE IN WHICH A FIRST CONTROL POINT ASSOCIATED WITH THE AFFINE MODE IS POSITIONED AT A FIRST CORNER OF THE CURRENT BLOCK — S1110

DETERMINING A CURRENT TEMPLATE ASSOCIATED WITH THE FIRST CONTROL POINT, THE CURRENT TEMPLATE BEING ADJACENT TO THE FIRST CONTROL POINT — S1120

DETERMINING A PLURALITY OF CANDIDATE REFERENCE TEMPLATES IN A REFERENCE PICTURE FOR THE CURRENT TEMPLATE ASSOCIATED WITH THE FIRST CONTROL POINT — S1130

SELECTING A REFERENCE TEMPLATE FROM THE PLURALITY OF CANDIDATE REFERENCE TEMPLATES FOR THE CURRENT TEMPLATE ASSOCIATED WITH THE FIRST CONTROL POINT BASED ON A TEMPLATE MATCHING (TM) COST THAT INDICATES A RESPECTIVE DIFFERENCE BETWEEN EACH CANDIDATE REFERENCE TEMPLATE AND THE CURRENT TEMPLATE OF THE FIRST CONTROL POINT — S1140

DETERMINING A FIRST CONTROL POINT MOTION VECTOR (CPMV) BASED ON THE SELECTED REFERENCE TEMPLATE, THE FIRST CPMV INDICATING AN OFFSET BETWEEN THE SELECTED REFERENCE TEMPLATE IN THE REFERENCE PICTURE AND THE CURRENT TEMPLATE ASSOCIATED WITH THE FIRST CONTROL POINT — S1150

RECONSTRUCTING THE CURRENT BLOCK BASED AT LEAST ON THE FIRST CPMV — S1160

STOP — S1199

*FIG. 11*

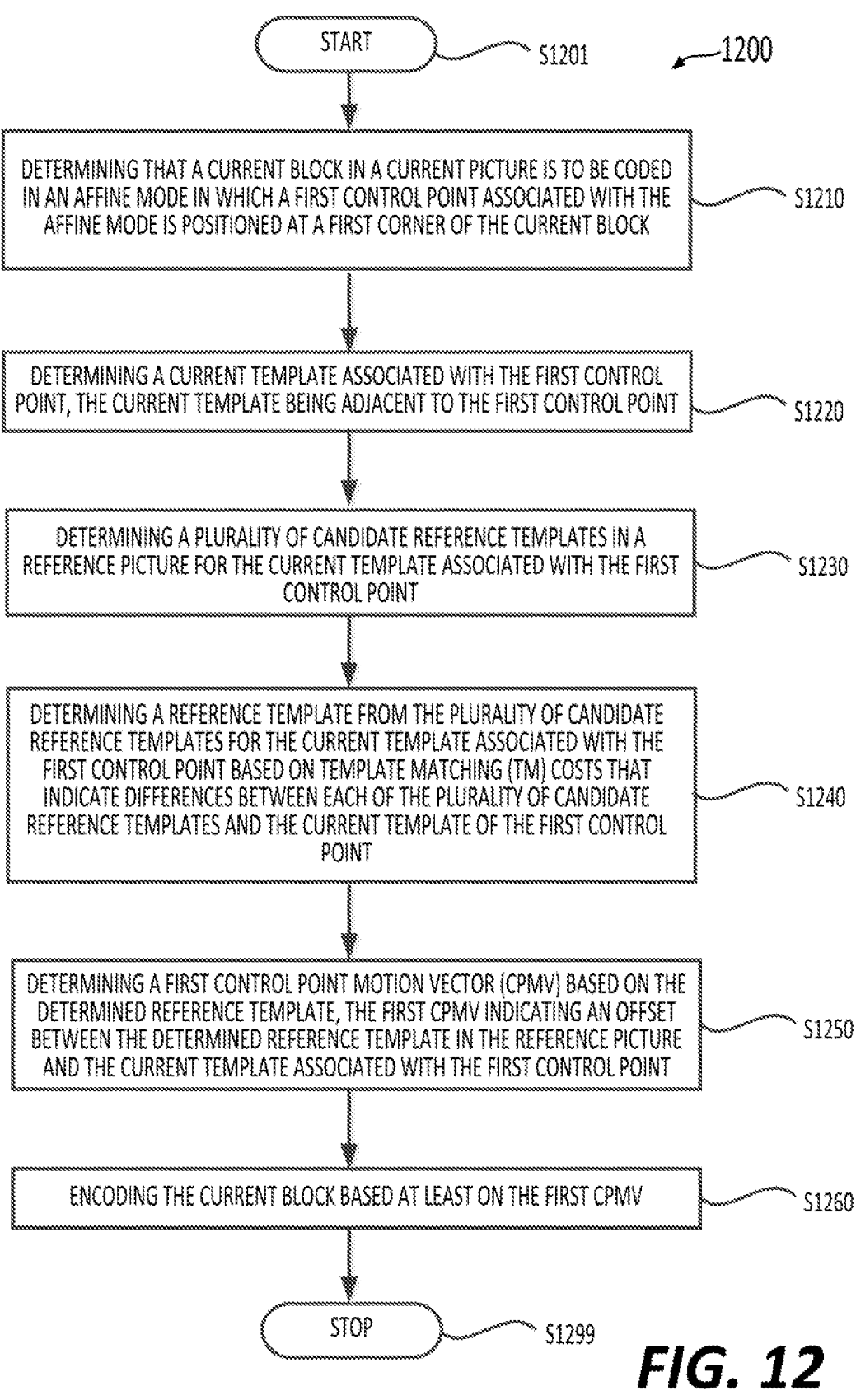

START ⟍ S1201        ⟵1200

DETERMINING THAT A CURRENT BLOCK IN A CURRENT PICTURE IS TO BE CODED IN AN AFFINE MODE IN WHICH A FIRST CONTROL POINT ASSOCIATED WITH THE AFFINE MODE IS POSITIONED AT A FIRST CORNER OF THE CURRENT BLOCK ⟍ S1210

DETERMINING A CURRENT TEMPLATE ASSOCIATED WITH THE FIRST CONTROL POINT, THE CURRENT TEMPLATE BEING ADJACENT TO THE FIRST CONTROL POINT ⟍ S1220

DETERMINING A PLURALITY OF CANDIDATE REFERENCE TEMPLATES IN A REFERENCE PICTURE FOR THE CURRENT TEMPLATE ASSOCIATED WITH THE FIRST CONTROL POINT ⟍ S1230

DETERMINING A REFERENCE TEMPLATE FROM THE PLURALITY OF CANDIDATE REFERENCE TEMPLATES FOR THE CURRENT TEMPLATE ASSOCIATED WITH THE FIRST CONTROL POINT BASED ON TEMPLATE MATCHING (TM) COSTS THAT INDICATE DIFFERENCES BETWEEN EACH OF THE PLURALITY OF CANDIDATE REFERENCE TEMPLATES AND THE CURRENT TEMPLATE OF THE FIRST CONTROL POINT ⟍ S1240

DETERMINING A FIRST CONTROL POINT MOTION VECTOR (CPMV) BASED ON THE DETERMINED REFERENCE TEMPLATE, THE FIRST CPMV INDICATING AN OFFSET BETWEEN THE DETERMINED REFERENCE TEMPLATE IN THE REFERENCE PICTURE AND THE CURRENT TEMPLATE ASSOCIATED WITH THE FIRST CONTROL POINT ⟍ S1250

ENCODING THE CURRENT BLOCK BASED AT LEAST ON THE FIRST CPMV ⟍ S1260

STOP ⟍ S1299

*FIG. 12*

TEMPLATE MATCHING REFINEMENT FOR AFFINE MOTION

INCORPORATION BY REFERENCE

The present application claims the benefit of priority to U.S. Provisional Application No. 63/417,279, "Template Matching Refinement for Affine Motion" filed on Oct. 18, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry.

According to an aspect of the disclosure, a method of video decoding is provided. In the method, a video bitstream comprising a current block in a current picture is received. The current block is coded in an affine mode in which a first control point associated with the affine mode is positioned at a first corner of the current block. A current template associated with the first control point is determined, where the current template is adjacent to the first control point. A plurality of candidate reference templates is determined in a reference picture for the current template associated with the first control point. A reference template is selected from the plurality of candidate reference templates for the current template associated with the first control point based on a template matching (TM) cost. The TM cost indicates a respective difference between each candidate reference template and the current template of the first control point. A first control point motion vector (CPMV) is determined based on the selected reference template, where the first CPMV indicates an offset between the selected reference template in the reference picture and the current template associated with the first control point. The current block is reconstructed based at least on the first CPMV.

In an example, a first block is determined such that the first control point is positioned at a center of the first block. The current template associated with the first control point is determined as a reconstructed region that is positioned at one or a combination of (i) a top side of the first block and (ii) a left side of the first block.

In an example, the current template associated with the first control point is determined as a reconstructed region that is adjacent to the first control point and includes at least one of (i) a first region at a top side of the current block or (ii) a second region at a left side of the current block.

In an example, the current template associated with the first control point is determined as a reconstructed region in which the first control point is a center of the reconstructed region. The reconstructed region includes at least one of (i) a first region that is positioned at a top side of the current block and further extends beyond a vertical side of the current block, and (ii) a second region that is positioned at a left side of the current block and further extends beyond a horizontal side of the current block.

In an example, the first region includes a height equal to N samples and a width equal to a width of an affine subblock of the current block, and the second region includes a width equal to N samples and a height equal to a height of the affine subblock of the current block, where N is a positive integer.

In an example, an initial first CPMV is determined for the first control point, where the initial first CPMV indicates an initial reference template in the reference picture. The plurality of candidate reference templates is determined within a search range of the initial reference template. The search range includes M×M pixels, where M is less than 8.

In an example, the plurality of candidate reference templates is determined within the search range of the initial reference template based on a plurality of search step. A number of the plurality of search steps is determined based on one of a predefined resolution and a predefined number.

In an example, the TM costs between the current template associated with the first control point and each of the plurality of candidate reference templates are determined. The reference template is selected from the plurality of candidate reference templates that corresponds to a minimum TM cost among the determined TM costs between the current template associated with the first control point and each of the plurality of candidate reference templates.

In an example, a template of the current block that includes a first region at a top side of the current block and a second region at a left side of the current block is determined. A first candidate CPMV is determined for the first control point based on a first candidate reference template of the plurality of candidate reference templates. A second candidate CPMV is determined for the first control point based on a second candidate reference template of the plurality of candidate reference templates. A first set of subblock affine MVs is determined for subblocks of the current block that are adjacent to the template of the current block based at least on the first candidate CPMV. A second set of subblock affine MVs is determined for the subblocks of the current block that are adjacent to the template of the current block based at least on the second candidate CPMV. A first set of reference subblock affine MVs is determined for subblocks of a collocated block of the current block that corresponds to the first set of subblock affine MVs. A second set of reference subblock affine MVs is determined for the subblocks of the collocated block of the current block that corresponds to the second set of subblock affine MVs. A first reference template is determined based on the first set of reference subblock affine MVs and a second reference template is determined based on the second set of reference subblock affine MVs. A first TM cost between the template of the current block and the first reference template is determined. A second TM cost between the template of the current block and the second reference template is determined. One of the first candidate reference template and the second candidate reference template is selected as the reference template. The one of the first candidate reference template and the second candidate reference template corresponds to a smaller one of the first TM cost and the second TM cost.

In an example, a reference subblock is determined for each of the subblocks of the collocated block based on a respective one of the first set of reference subblock affine MVs. A subblock template is determined for each of the reference subblocks for the subblocks of the collocated block. The first reference template is determined as a combination of the subblock templates.

In an example, the affine mode includes one of an affine uni-prediction mode and an affine bi-prediction mode.

In an example, the current block includes a second control point at a second corner of the current block. An initial second CPMV is determined for the second control point. A second CPMV is determined for the second control point by adding a translation MV offset to the initial second CPMV, where the translation MV offset is derived based on decoder side motion vector refinement (DMVR).

According to another aspect of the disclosure, an apparatus is provided. The apparatus includes processing circuitry. The processing circuitry can be configured to perform any of the described methods for video decoding/encoding. In an example, the processing circuitry is configured to receive a video bitstream comprising a current block in a current picture, where the current block is coded in an affine mode in which a first control point associated with the affine mode is positioned at a first corner of the current block. The processing circuitry is configured to determine a current template associated with the first control point, where the current template is adjacent to the first control point. The processing circuitry is configured to determine a plurality of candidate reference templates in a reference picture for the current template associated with the first control point. The processing circuitry is configured to select a reference template from the plurality of candidate reference templates of the current template associated with the first control point based on a template matching (TM) cost. The TM cost indicates a respective difference between each candidate reference template and the current template of the first control point. The processing circuitry is configured to determine a first control point motion vector (CPMV) based on the selected reference template, the first CPMV indicating an offset between the selected reference template in the reference picture and the current template associated with the first control point. The processing circuitry is configured to reconstruct the current block based at least on the first CPMV.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which:

FIG. 5 is a schematic illustration of an exemplary affine motion vector field associated with subblocks of a block.

FIG. 11 shows a flow chart outlining a decoding process according to some embodiments of the disclosure.

FIG. 12 shows a flow chart outlining an encoding process according to some embodiments of the disclosure.

DETAILED DESCRIPTION OF EMBODIMENTS

Figure 1:
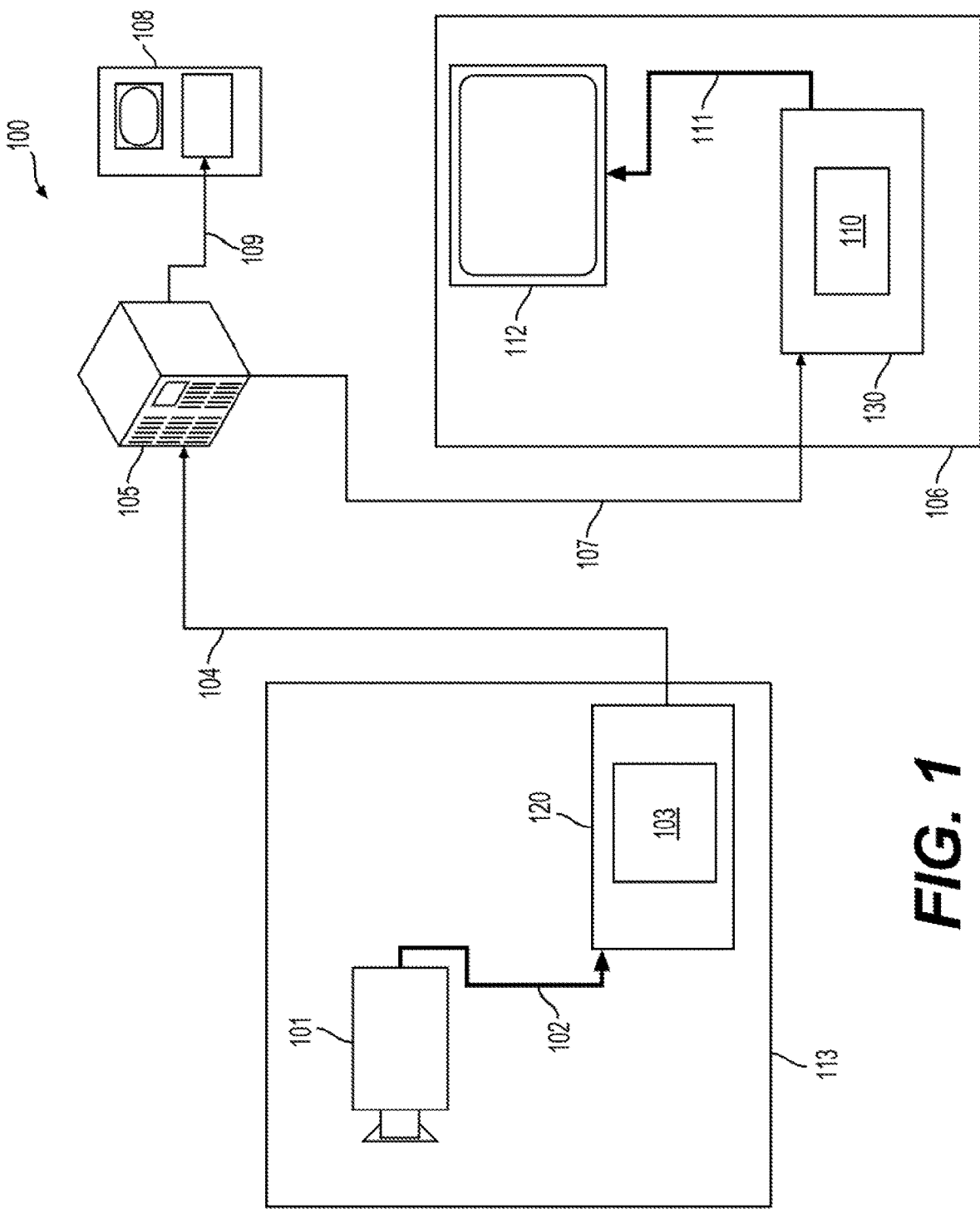
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
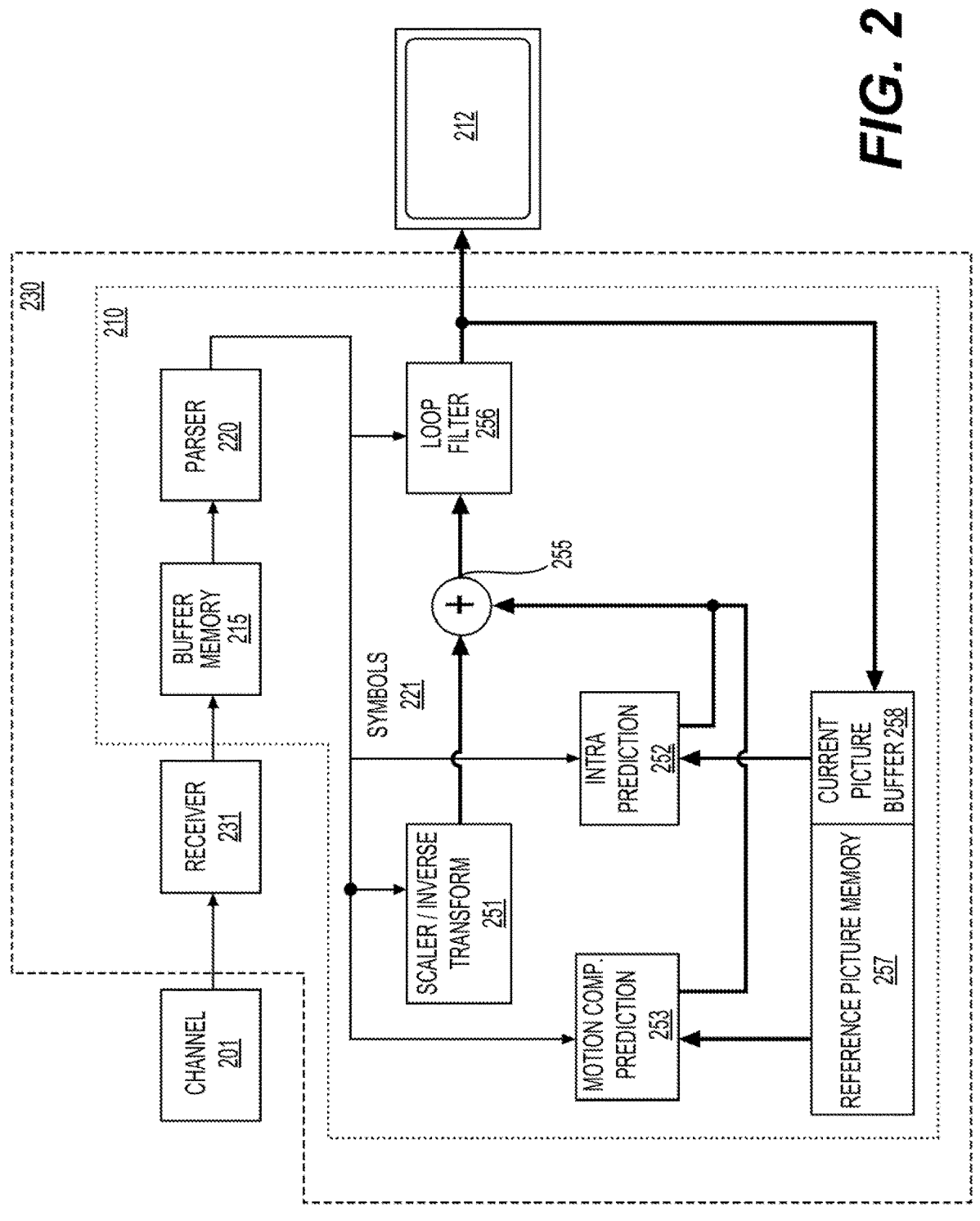
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega-samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
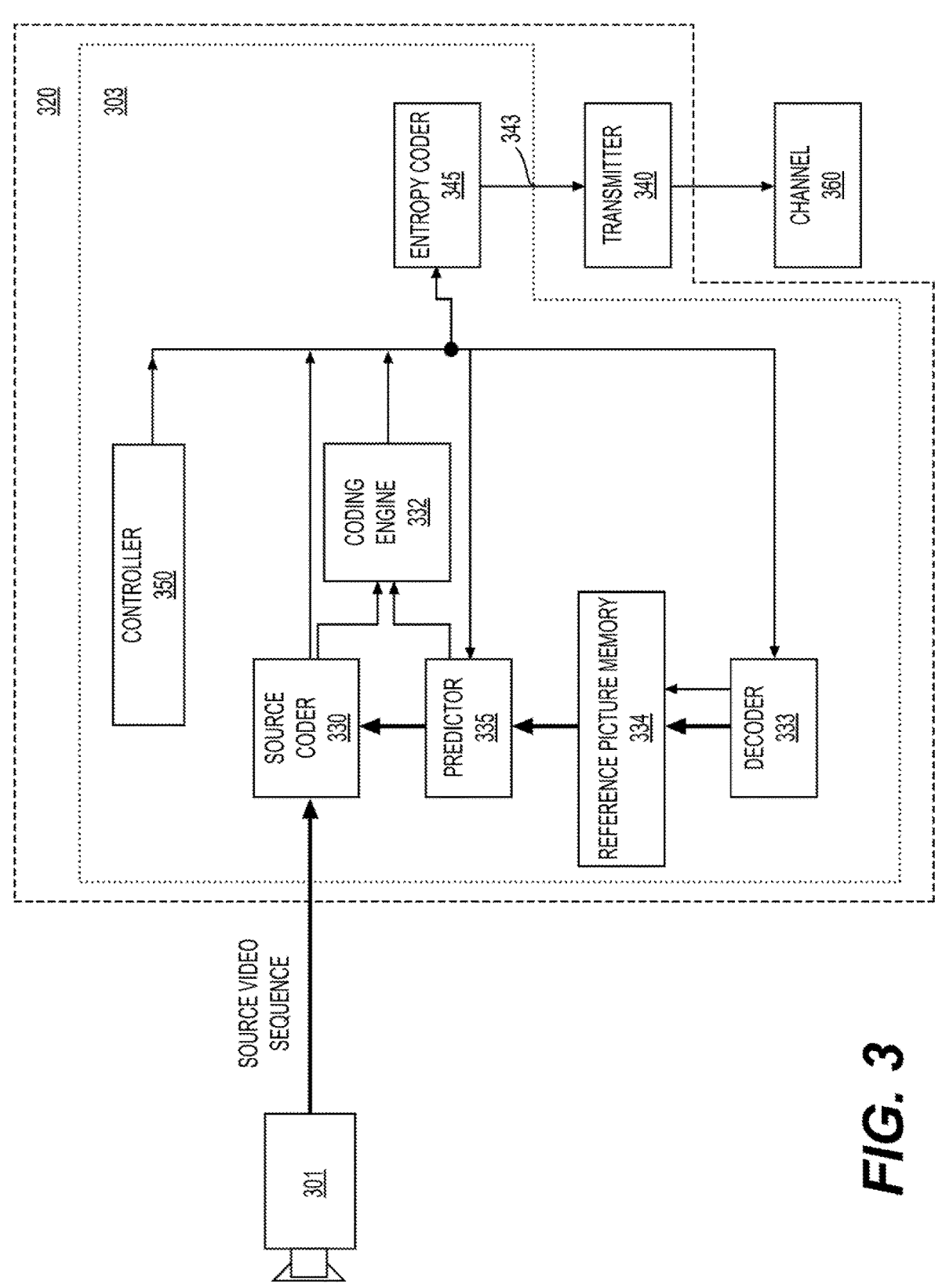
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/ SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

This disclosure includes aspects related to template matching-based motion refinement on affine coded blocks.

Figure 4B:
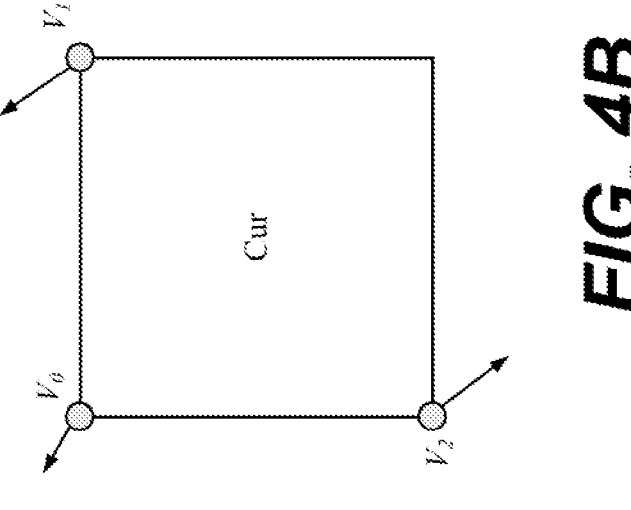
FIG. 4B is a schematic illustration of an exemplary 6-parameter affine model.
Figure 4A:
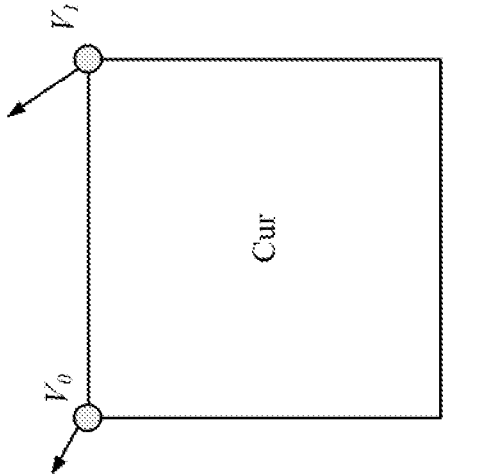
FIG. 4A is a schematic illustration of an exemplary 4-parameter affine model.

A translation motion model can be applied for a motion compensation prediction (MCP), such as in HEVC. In a real world, there are many kinds of motions, such as zoom in/out, rotation, perspective motions, and other irregular motions. A block-based affine transform motion compensation prediction can be applied, such as in a VVC test model (VTM). For example, an affine motion field of a block can be described by motion information of two control point motion vectors (4-parameter) in FIG. 4A or three control point motion vectors (6-parameter) in FIG. 4B.

For a 4-parameter affine motion model, a motion vector at a sample location (x, y) in a block can be derived as follows in equation (1):

$$
\begin{cases}
mv_x = \dfrac{mv_{1x} - mv_{0x}}{W}x + \dfrac{mv_{1y} - mv_{0y}}{W}y + mv_{0x} \\
mv_y = -\dfrac{mv_{1y} - mv_{0y}}{W}x + \dfrac{mv_{1x} - mv_{0x}}{W}y + mv_{0y}
\end{cases}
\qquad \text{Eq. (1)}
$$

which can also be described as follows in equation (2)

$$
\begin{cases}
mv_x = ax + by + c \\
mv_y = -bx + ay + f
\end{cases}
\qquad \text{Eq. (2)}
$$

For a 6-parameter affine motion model, a motion vector at a sample location (x, y) in a block can be derived as follows in equation (3):

$$
\begin{cases}
mv_x = \dfrac{mv_{1x} - mv_{0x}}{W}x + \dfrac{mv_{2x} - mv_{0x}}{H}y + mv_{0x} \\
mv_y = -\dfrac{mv_{1y} - mv_{0y}}{W}x + \dfrac{mv_{2y} - mv_{0y}}{H}y + mv_{0y}
\end{cases}
\qquad \text{Eq. (3)}
$$

which can also be described as follows in equation (4)

$$
\begin{cases}
mv_x = ax + by + c \\
mv_y = dx + ey + f
\end{cases}
\qquad \text{Eq. (4)}
$$

where ($mv_{0x}$, $mv_{0y}$) can be a motion vector of a top-left corner control point, ($mv_{1x}$, $mv_{1y}$) can be a motion vector of a top-right corner control point, and ($mv_{2x}$, $mv_{2y}$) can be a motion vector of a bottom-left corner control point.

To simplify a motion compensation prediction, a block-based affine transform prediction can be applied. As shown in FIG. 5, to derive a motion vector of each 4×4 luma sub-block in the block, a motion vector (MV) of a center sample (e.g., (502)) of each sub-block (e.g., (504)) of a block (500) can be calculated according to an equation of an affine motion model, such as one of the equations (1)-(4), and further be rounded to a 1/16 fraction accuracy. Then motion compensation interpolation filters can be applied to generate a prediction of each sub-block with the derived motion vector. A sub-block size of chroma-components can also be set as 4×4. A motion vector of a 4×4 chroma sub-block can be calculated as an average of MVs of the four corresponding 4×4 luma sub-blocks.

A base MV (e.g., a translational part of an affine model) of the affine model of a coding block coded with an affine merge mode can be refined by only applying a first pass of multi-pass DMVR, in some examples. For example, a translation MV offset can be added to all CPMVs of a candidate in an affine merge list if the candidate meets the DMVR condition. A motion vector offset can be derived by minimizing a cost of a bilateral matching which can the same as a conventional DMVR. Further, the DMVR condition may not be changed.

A motion vector offset searching process can be the same as the first pass of the multi-pass DMVR. For example, in ECM, a 3×3 square search pattern can be used to loop (or search) through a search range [−8, +8] in a horizontal direction and [−8, +8] in a vertical direction to find a best (or selected) integer MV offset. A half pel search can be conducted around the best integer position and an error surface estimation can be performed to find a MV offset with $\frac{1}{16}$ precision.

The refined CPMV can be stored for both spatial and temporal motion vector predictions as the multi-pass DMVR in ECM.

Figure 6:
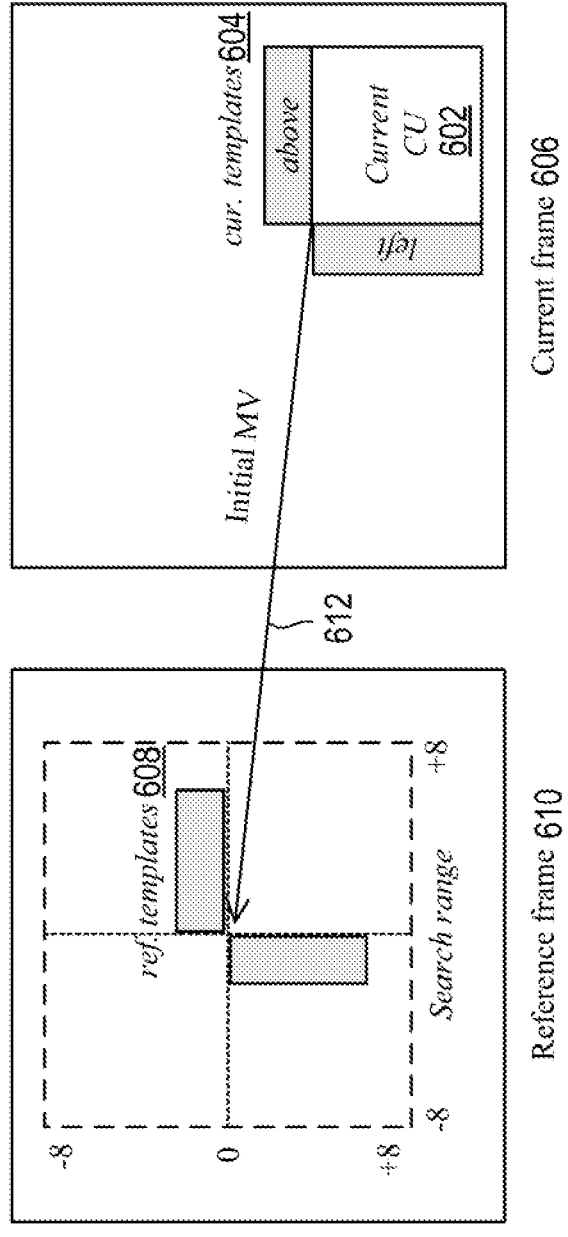
FIG. 6 is a schematic illustration of an exemplary template matching process.

Template matching (TM) can be a decoder-side MV derivation method to refine motion information of a current CU by finding a closest match between a template (e.g., top and/or left neighbouring blocks of the current CU) in the current picture and a block (e.g., a same size to the template) in a reference picture. FIG. 6 shows that a better (or selected) MV can be searched around an initial motion (612) of a current CU (602) within a [−8, +8]-pel search range. As shown in FIG. 6, the current block (602) can include a template (or current templates) (604) that includes top and left neighboring blocks of the current block (602) in a current frame (606). A block (or reference templates) (608) in a reference frame (610) can be indicated by an initial MV (612). A better MV (not shown) can be searched (or identified) around the initial motion vector (612) of the current CU (602) within a [−8, +8]-pel search range.

In an aspect, the template matching method, such in JVET-J0021, can be used with the following modifications: a search step size can be determined based on adaptive motion vector resolution (AMVR) mode and TM can be cascaded with a bilateral matching process in merge modes.

In advanced motion vector prediction (AMVP) mode, an MVP candidate can be determined based on a template matching error to select one which reaches a minimum difference between the current block template and the reference block template, and then TM can be performed for the determined MVP candidate for MV refinement. TM can refine the MVP candidate by starting a search from a full-pel MVD precision (e.g., 4-pel for 4-pel AMVR mode) within a [−8, +8]-pel search range by using an iterative diamond search. The AMVP candidate can be further refined by using a cross search with a full-pel MVD precision (e.g., 4-pel for 4-pel AMVR mode), followed sequentially by a half-pel precision and a quarter-pel precision depending on AMVR mode as specified in Table 1. The search process can ensure that the MVP candidate keeps a same MV precision as indicated by the AMVR mode after the TM process. In the search process, if a difference between a previous minimum cost and a current minimum cost in the interaction is less than a threshold (e.g., an area of the block), the search process can terminate.

TABLE 1

| Search pattern | AMVR mode | | | | Merge mode | |
| --- | --- | --- | --- | --- | --- | --- |
| | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | | v |

Search patterns of AMVR mode and merge mode with AMVR.

In a merge mode, a similar search method can be applied to a merge candidate indicated by a merge index. As Table 1 shows, TM may be performed all the way down to a ⅛-pel MVD precision or skipping precisions beyond a half-pel MVD precision, depending on whether an alternative interpolation filter (that is used when AMVR is of half-pel mode) is used according to merged motion information. Besides, when TM mode is enabled, template matching may work as an independent process or as an extra MV refinement process between a block-based and a subblock-based bilateral matching (BM) methods, depending on whether BM can be enabled or not according to an enabling condition check.

In adaptive reordering of merge candidates with template matching (ARMC-TM), merge candidates can be adaptively reordered with TM. The reordering method can be applied to a regular merge mode, a TM merge mode, and an affine merge mode (excluding the SbTMVP candidate). For the TM merge mode, merge candidates can be reordered before a refinement process.

After a merge candidate list is constructed, merge candidates can be divided into several subgroups. A subgroup size can be set to 5 for the regular merge mode and the TM merge mode. The subgroup size can be set to 3 for the affine merge mode. Merge candidates in each subgroup can be reordered ascendingly according to cost values based on template matching. For simplification, merge candidates in the last but not the first subgroup may not be reordered. Zero candidates from the ARMC reordering process can be excluded during the construction of the merge motion vector candidates list.

A template matching cost of a merge candidate can be measured by a sum of absolute differences (SAD) between samples of a template of the current block and reference samples corresponding to the samples of the template of the current block. The template can include a set of reconstructed samples neighboring to the current block. Reference samples of the template can be located by motion information of the merge candidate.

When a merge candidate utilizes a bi-directional prediction, the reference samples of the template of the merge candidate can also be generated by the bi-prediction.

For subblock-based merge candidates with a subblock size equal to Wsub×Hsub, an above template can include several sub-templates with a size of Wsub×1, and a left template can include several sub-templates with a size of 1×Hsub. Motion information of subblocks in a first row and a first column of a current block can be used to derive reference samples of each sub-template.

Figure 7:
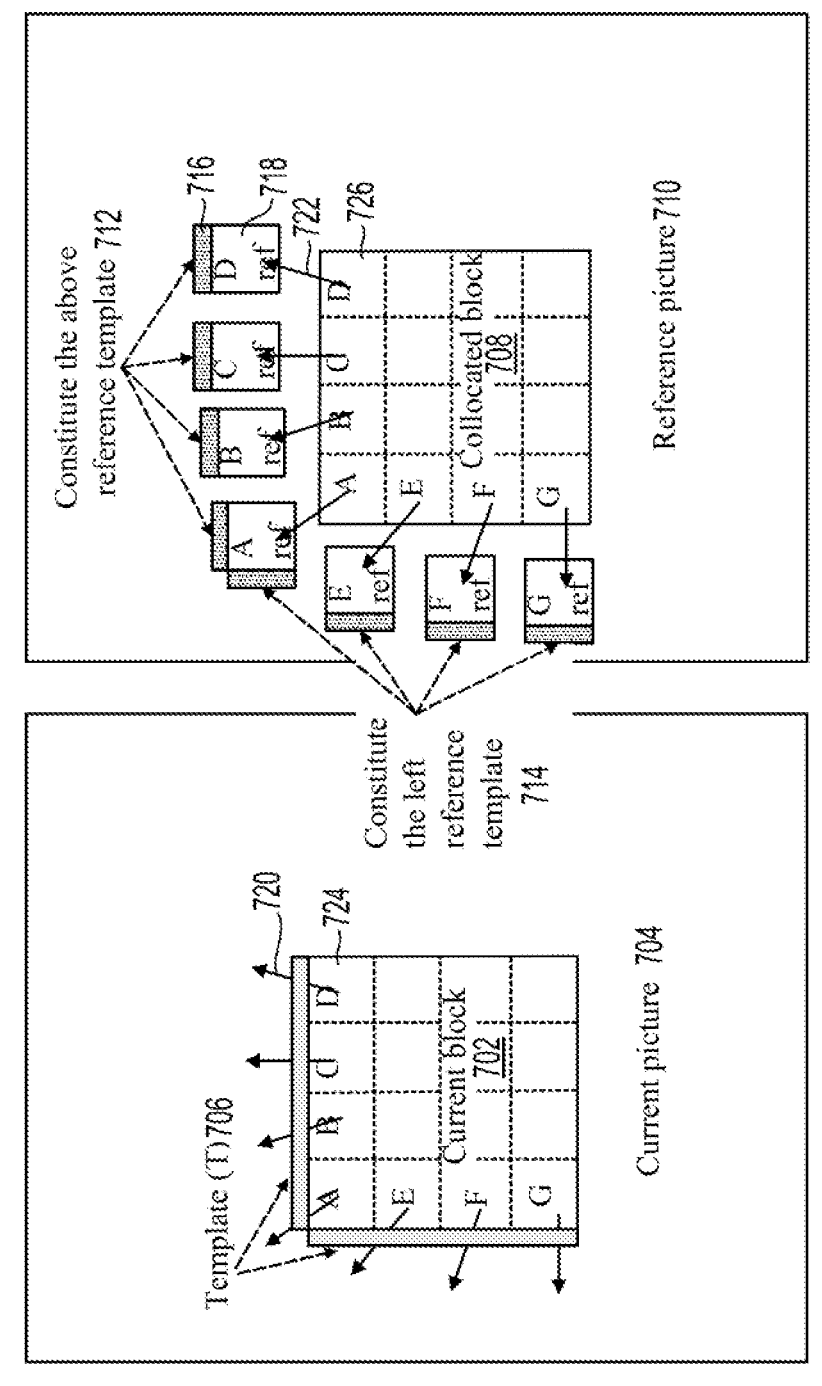
FIG. 7 is a schematic illustration of an exemplary subblock-based template matching process.

FIG. 7 shows an exemplary subblock-based template matching process (700) (or process (700)). As shown in FIG. 7, a current block (702) can be included in a current picture (704). The current block (702) can include a template (706) at a top side and a left side of the current block (702). The current block (702) can include a plurality of subblocks, such as subblocks A-G, adjacent to the template (706). Each of the subblocks A-G can include a respective MV that indicate a reference subblock of the respective subblock. The current block (702) can include a collocated block (708) in a reference picture (710). The collocated block (708) can include a plurality of collocated subblocks A-G corresponding to the subblocks A-G in the current block (702). Each of the collocated subblocks A-G can have a respective MV. The MVs of the collocated subblocks A-G can have the same orientations as the MVs of the subblock A-G. Based on the MVs of the collocated subblocks A-G, a plurality of reference subblocks A-G for the collocated subblocks A-G can be determined. Further, a template can be determined for each of the reference subblock A-G. For example, a template (or subblock template) (716) can be determined for the reference subblock D. Based on the templates of the reference subblocks A-G, a reference template for the collocated block (708) can be determined. The reference template for the collocated block (708) can include an above reference template (721) and a left reference template (714). The above reference template (712) can include templates of the reference subblocks A-D, and the left reference template (714) can include templates of the reference subblocks A and E-G. Further, a template matching cost can be calculated between the template (706) of the current block (702) and the reference template of the collocated block (708).

An affine model-based method or a CPMV-based DMVR method may be used to improve coding efficiency. However, coding efficiency can be further improved by applying template matching-based MV refinement methods.

In the disclosure, template matching refinement can be applied to refine CPMVs for an affine block. For example, a current template associated with a first control point of a current block can be determined, where the current template is adjacent to the first control point. A plurality of candidate reference templates can be determined in a reference picture for the current template associated with the first control point. A reference template can be determined, or selected, from the plurality of candidate reference templates for the current template associated with the first control point based on TM costs. The TM costs can indicate differences between each of the plurality of candidate reference templates and the current template of the first control point. A first CPMV can be determined based on the determined (or selected) reference template, where the first CPMV can indicate an offset between the determined reference template in the reference picture and the current template associated with the first control point.

Figure 8:
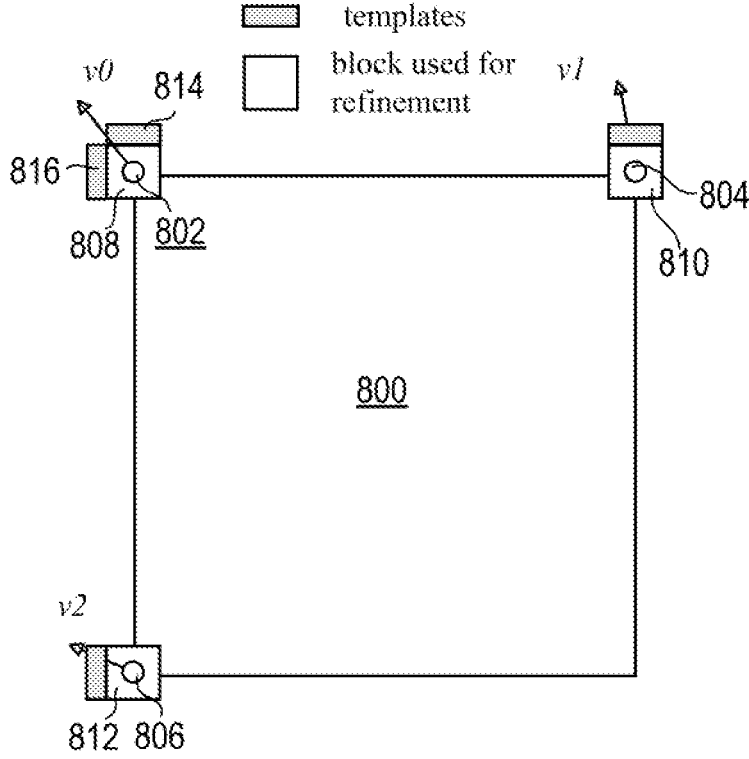
FIG. 8 shows first exemplary template positions for template matching-based refinement.
Figure 9:
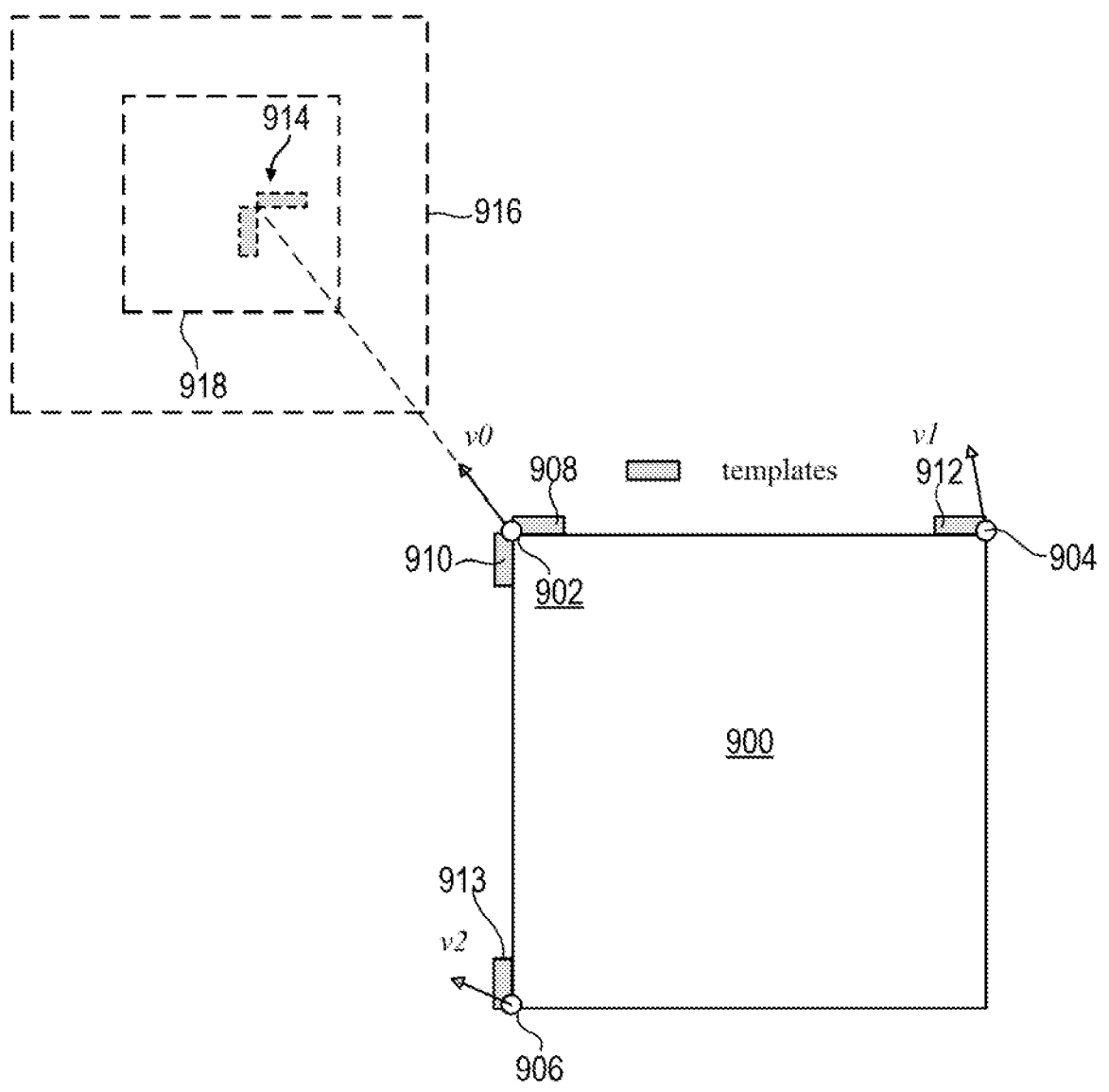
FIG. 9 shows second exemplary template positions for template matching-based refinement.
Figure 10:
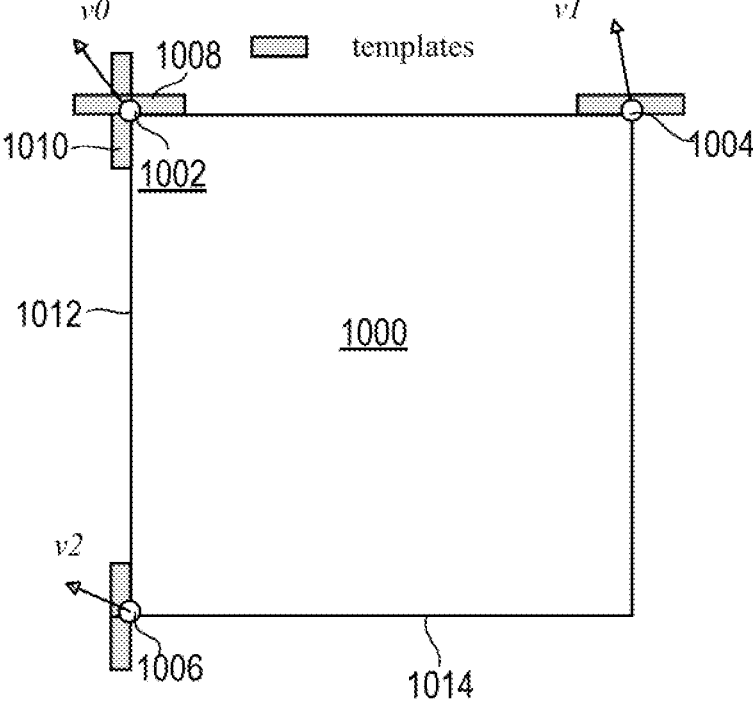
FIG. 10 shows third exemplary template positions for template matching-based refinement.

In the disclosure, a current template associated with a first control point of a current block can be adjacent to the first control point. In an example, as shown in FIG. 8, a first control point (802) can be positioned at an upper left corner of a current block (800) and further at a center of a first block (808). A current template can include a top region (814) positioned at a top side of the first block (808) and a left region (816) positioned at a left side of the first block (808). In an example, as shown in FIG. 9, a first control point (902) can be positioned at an upper left corner of a current block (900). A current template can include an above template (908) at a top side of the current block (900) and/or a left template (910) at a left side of the current block (900). Both the above template (908) and the left template (910) can further be in contact with, or otherwise adjacent to, the first control point (902). In an example, as shown in FIG. 10, a first control point (1002) can be positioned at an upper left corner of a current block (1000) and further within a current template that includes a first region (1008) at a top side of the current block (1000) and a second region (1010) at a left side of the current block (1000).

In an example, to determine the reference template from the candidate reference templates for the current template associated with the first control point, the TM costs between the current template associated with the first control point and each of the plurality of candidate reference templates can be determined. The reference template can be determined from the plurality of candidate reference templates that corresponds to a minimum TM cost among the determined TM costs between the current template associated with the first control point and each of the plurality of candidate reference templates.

In an aspect, the template matching refinement can be applied for one or more of the CPMVs of the affine block. A refined CPMV with a best (or selected) template matching cost for a control point can be used as a final CPMV of the control point.

For example, the affine block can include a first control point. A current template associated with the first control point can be determined. An exemplary template of the first control point can be shown in FIGS. 8-10. A plurality of candidate reference templates can be determined within a search range of an initial candidate reference template in a reference picture. The initial candidate reference template can be indicated by an initial CPMV of the first control point. A reference template can be determined, or selected, from the plurality of candidate reference templates for the current template associated with the first control point based on TM costs. The TM costs can indicate differences between each of the plurality of candidate reference templates and the current template of the first control point. A refined CPMV can be determined based on the determined reference template, where the refined CPMV can indicate an offset between the determined reference template in the reference picture and the current template associated with the first control point.

In an aspect, a template size can be set according to an affine subblock size. In an example, an above template can be set as a subblock width SubW×N, where N is can be integer, such as 1 or 2. In an example, a left template can be set as a subblock height SubH×M, where M can be an integer, such as 1 or 2.

In an example, as shown in FIG. 9, a current block (900) can include a first control point (902), a second control point (904), and a third control point (906). A template (or current template) associated with the first control point (902) can include an above template (908) and a left template (910). The above template (908) can include a height equal to N samples and a width equal to a width of an affine subblock (not shown) of the current block, and the left template (910) can include a width equal to N samples and a height equal to a height of the affine subblock of the current block, where N is a positive integer. An exemplary affine subblock can be shown as the subblock (504) in FIG. 5

In an aspect, each control point can be refined based on a block with size of N×M. The control point can be included in the block. For example, the control point can be positioned at a center position (N/2, M/2) of the block. Available template areas can be derived from neighboring samples of the block. Exemplary template areas can be shown in FIG. 8 in which a 6-parameter affine model with 3 control points is provided. Similar template areas can also be applied to a 4-parameter affine model with 2 control points.

As shown in FIG. 8, a current block (800) can include a first control point (802), a second control point (804), and a third control point (806). Three blocks (808), (810), and (812) can be defined such that the control points are positioned in the center positions of the blocks. For example, the first block (808) can be determined such that the first control point (802) is positioned at a center of the first block (808). A template (or a current template) associated with the first control point (802) can be determined as a reconstructed region that include a top region (814) positioned at a top side of the first block (808) and a left region (816) positioned at a left side of the first block (808).

In an aspect, each control point can be refined based on one or more templates immediately neighboring to the respective control point. In an example, a template size may be set as an affine subblock size. FIG. 9 shows exemplary templates based on a 6-parameter affine with 3 control points. Similar template areas can be applied to 2 control points in a 4-parameter model.

As shown in FIG. 9, a template associated with the first control point (902) can be determined as a reconstructed region that is adjacent to the first control point (902) and includes the above template (908) at a top side of the current block (900) or the left template (910) at a left side of the current block (900).

In an aspect, a template size can be set as a multiple of a subblock size, such as twice the subblock size. Exemplary template areas can be shown in FIG. 10 based on a 6-parameter affine with 3 control points. Similar template areas can be applied to 2 control points for a 4-parameter affine model.

As shown in FIG. 10, a current block (1000) can include a first control point (1002), a second control point (1004), and a third control point (1006). A template associated with the first control point (1002) can include a first region (1008) that is positioned at a top side of the current block (1000) and further extends beyond a vertical side (e.g., a left side (1012)) of the current block (1000), and a second region (1010) that is positioned at the left side (1012) of the current block (1000) and further extends beyond a horizontal side (e.g., a bottom side (1014)) of the current block (1000). In an example, a width of the first region (1008) can be twice a width of a subblock (not shown) of the current block (1000). In an example, a height of the second region (1010) can be twice a height of the subblock of the current block (1000).

In an aspect, control points with a valid reconstructed template can be refined by template matching. For example, as shown in FIG. 9, the above template (908) and the left template (910) associated with the first control point (902) can be reconstructed samples. A CPMV v0 of the first control point (902) can be refined based on the above template (908) and the left template (910) according to TM.

In an example, as shown in FIG. 9, an initial first CPMV v0 can be determined for the first control point (902), where the initial first CPMV v0 can indicate an initial reference template (914) in a reference picture (916). A plurality of candidate reference templates (not shown) can be determined within a search range (918) that includes the initial reference template (914). TM costs between the template (e.g., the above template (908) and the left template (910)) associated with the first control point (902) and each of the plurality of candidate reference templates can be determined. A reference template can be determined, or selected, from the plurality of candidate reference templates that corresponds to a minimum TM cost among the determined TM costs between the template associated with the first control point (902) and each of the plurality of candidate reference templates. A refined first CPMV can be determined based on the determined reference template, where the refined first CPMV can indicate an offset between the determined reference template in the reference picture and the template associated with the first control point (902).

In an aspect, the inter template matching method can be used for refining each CPMV. For example, as shown in FIG. 9, CPMV v0 of the first control point (902) can be refined based on the above template (908) and the left template (910) associated with the first control point (902). CPMV v1 of the second control point (904) can be refined based on an above template (912). CPMV v2 of the third control point (906) can be refined based on left template (913).

In an aspect, the inter template matching method, such as the inter template matching shown in FIG. 6, can be used with a reduced search range or a reduced number of search steps to reduce complexity of the CPMV refinement.

In an example, as shown in FIG. 9, the initial first CPMV v0 can be determined for the first control point (902), where the initial first CPMV v0 can indicate the initial reference template (914) in the reference picture (916). A plurality of candidate reference templates (not shown) can be determined within the search range (918) that includes the initial reference template (914) for the current template (e.g., the above template (908) and the left template (910)) of the first control point (902). The search range (918) can include M×M pixels, where M is less than 8.

In an example, the plurality of candidate reference templates can be determined within the search range (918) of the initial reference template (914) based on a plurality of search step. A number of the plurality of search steps can be determined based on one of a predefined resolution (e.g., 1 pixel or ¼ pixel) and a predefined number.

In an aspect, for each candidate CPMV refinement, subblock affine MVs can be generated and subblock templates can be generated accordingly. A candidate CPMV refinement which minimizes a subblock template matching cost can be a selected CPMV refinement for a current affine block.

For example, as shown in FIG. 9, a plurality of candidate reference templates (not shown) can be determined for the first control point (902) in the search range (918). Candidate CPMVs (or candidate CPMV refinements) can be determined for the first control point (902) based on the candidate reference templates. Each candidate CPMV for the first control point (902) can indicate an offset between a respective candidate reference template and the template (e.g., the above template (908) and left template (910)) of the first control point (902). Similarly, candidate CPMVs can be determined for the second control point (904) and for the third control point (906). Further, a plurality of sets of candidate CPMVs can be defined for the control points (902), (904), and (906) based on the determined CPMVs for the control points (902), (904), and (906). Each set of candidate CPMVs can build a 6-parameter affine model for the current block (900). Based on each set of candidate CPMVs, a set of subblock affine MVs for subblocks (e.g., subblock (724) in FIG. 7) in the current block (900) can be generated. An exemplary subblock affine MVs can be shown in FIG. 5. Based on each set of subblock affine MVs (e.g., MV (720) in FIG. 7) for the current block (900), a set of reference subblock affine MVs (e.g., MV (722) in FIG. 7) can be determined for subblocks (e.g., subblock (726) in FIG. 7) in a collocated block (e.g., collocated block (708) in FIG. 7) of the current block (900) that corresponds to the set of subblock affine MVs for the current block (900). A reference subblock (e.g., a reference subblock (718) in FIG. 7) can be determined for each of the subblocks (e.g., subblock (726)) in the collocated block based on a respective one (e.g., MV (722)) of the set of reference subblock affine MVs. A subblock template (e.g., subblock template (716) in FIG. 7) can be determined for each of the reference subblocks (e.g., reference subblock (718)) of the subblocks (e.g., subblock (726)) in the collocated block. A set of subblock templates can be determined as a combination of the subblock templates for the reference subblocks of the subblock in the collocated block. An exemplary set of subblock templates can be shown as the above reference template (712) and the left reference template (714) in FIG. 7. Based on a subblock-based template matching process, such as the process (700), a subblock template matching cost can be determined between a template (not shown) of the current block (900) and each set of subblock templates. The template of the current block (900) can have a similar configuration as the template (706) in FIG. 7. A set of candidate CPMVs for the control points (902), (904), and (906) that corresponds to a minimum subblock template matching cost can be selected as the refined CPMVs for the block (900).

In an aspect, template matching-based CPMV refinement method can be used for an affine uni-prediction;

In an aspect, template matching-based CPMV refinement method can be used for an affine bi-prediction. In an example, each set of CPMVs on each reference list can be refined separately.

In an aspect, template matching-based CPMV refinement and DMVR based CPMV refinement can be used for different CPMVs in a same affine block.

For example, as shown in FIG. 9, the current block (900) can include the first control point (902) and the second control point (904). The initial CPMV v0 for the first control point (902) can be refined based on the template matching. The initial CPMV v1 for the second control point (904) can be refined by DMVR. To refine the initial CPMV v1, a refined CPMV for the second control point (904) can be determined by adding a translation MV offset to the initial CPMV v1, where the translation MV offset can be derived based on DMVR.

FIG. 11 shows a flow chart outlining a process (1100) according to an embodiment of the disclosure. The process (1100) can be used in a video decoder. In various embodiments, the process (1100) is executed by processing circuitry, such as the processing circuitry that performs functions of the video decoder (110), the processing circuitry that performs functions of the video decoder (210), and the like. In some embodiments, the process (1100) is implemented in software instructions, thus when the processing circuitry executes the software instructions, the processing circuitry performs the process (1100). The process starts at (S1101) and proceeds to (S1110).

At (S1110), a video bitstream comprising a current block in a current picture is received. The current block is coded in an affine mode in which a first control point associated with the affine mode is positioned at a first corner of the current block.

At (S1120), a current template associated with the first control point is determined, where the current template is adjacent to the first control point.

At (S1130), a plurality of candidate reference templates is determined in a reference picture for the current template associated with the first control point.

At (S1140), a reference template is selected from the plurality of candidate reference templates for the current template associated with the first control point based on a TM cost. The TM cost indicates a respective difference between each candidate reference template and the current template of the first control point.

At (S1150), a first CPMV is determined based on the selected reference template, where the first CPMV indicates an offset between the selected reference template in the reference picture and the current template associated with the first control point.

At (S1160), the current block is reconstructed based at least on the first CPMV.

In an example, a first block is determined such that the first control point is positioned at a center of the first block. The current template associated with the first control point is determined as a reconstructed region that is positioned at one or a combination of (i) a top side of the first block and (ii) a left side of the first block.

In an example, the current template associated with the first control point is determined as a reconstructed region that is adjacent to the first control point and includes at least one of (i) a first region at a top side of the current block or (ii) a second region at a left side of the current block.

In an example, the current template associated with the first control point is determined as a reconstructed region in which the first control point is a center of the reconstructed region. The reconstructed region includes at least one of (i) a first region that is positioned at a top side of the current block and further extends beyond a vertical side of the current block, and (ii) a second region that is positioned at a left side of the current block and further extends beyond a horizontal side of the current block.

In an example, the first region includes a height equal to N samples and a width equal to a width of an affine subblock of the current block, and the second region includes a width equal to N samples and a height equal to a height of the affine subblock of the current block, where N is a positive integer.

In an example, an initial first CPMV is determined for the first control point, where the initial first CPMV indicates an initial reference template in the reference picture. The plurality of candidate reference templates is determined within a search range of the initial reference template. The search range includes M×M pixels, where M is less than 8.

In an example, the plurality of candidate reference templates is determined within the search range of the initial reference template based on a plurality of search step. A number of the plurality of search steps is determined based on one of a predefined resolution and a predefined number.

In an example, the TM costs between the current template associated with the first control point and each of the plurality of candidate reference templates are determined. The reference template is selected from the plurality of candidate reference templates that corresponds to a minimum TM cost among the determined TM costs between the current template associated with the first control point and each of the plurality of candidate reference templates.

In an example, a template of the current block that includes a first region at a top side of the current block and a second region at a left side of the current block is determined. A first candidate CPMV is determined for the first control point based on a first candidate reference template of the plurality of candidate reference templates. A second candidate CPMV is determined for the first control point based on a second candidate reference template of the plurality of candidate reference templates. A first set of subblock affine MVs is determined for subblocks of the current block that are adjacent to the template of the current block based at least on the first candidate CPMV. A second set of subblock affine MVs is determined for the subblocks of the current block that are adjacent to the template of the current block based at least on the second candidate CPMV. A first set of reference subblock affine MVs is determined for subblocks of a collocated block of the current block that corresponds to the first set of subblock affine MVs. A second set of reference subblock affine MVs is determined for the subblocks of the collocated block of the current block that corresponds to the second set of subblock affine MVs. A first reference template is determined based on the first set of reference subblock affine MVs and a second reference template is determined based on the second set of reference subblock affine MVs. A first TM cost between the template of the current block and the first reference template is determined. A second TM cost between the template of the current block and the second reference template is determined. One of the first candidate reference template and the second candidate reference template is selected as the reference template. The one of the first candidate reference template and the second candidate reference template corresponds to a smaller one of the first TM cost and the second TM cost.

In an example, a reference subblock is determined for each of the subblocks of the collocated block based on a respective one of the first set of reference subblock affine MVs. A subblock template is determined for each of the reference subblocks for the subblocks of the collocated block. The first reference template is determined as a combination of the subblock templates.

In an example, the affine mode includes one of an affine uni-prediction mode and an affine bi-prediction mode.

In an example, the current block includes a second control point at a second corner of the current block. An initial second CPMV is determined for the second control point. A second CPMV is determined for the second control point by adding a translation MV offset to the initial second CPMV, where the translation MV offset is derived based on DMVR.

Then, the process proceeds to (S1199) and terminates.

The process (1100) can be suitably adapted. Step(s) in the process (1100) can be modified and/or omitted. Additional step(s) can be added. Any suitable order of implementation can be used.

FIG. 12 shows a flow chart outlining a process (1200) according to an embodiment of the disclosure. The process (1200) can be used in a video encoder. In various embodiments, the process (1200) is executed by processing circuitry, such as the processing circuitry that performs functions of the video encoder (103), the processing circuitry that performs functions of the video encoder (303), and the like. In some embodiments, the process (1200) is implemented in software instructions, thus when the processing circuitry executes the software instructions, the processing circuitry performs the process (1200). The process starts at (S1201) and proceeds to (S1210).

At (S1210), a current block in a current picture is determined to be coded in an affine mode in which a first control point associated with the affine mode is positioned at a first corner of the current block.

At (S1220), a current template associated with the first control point is determined, where the current template is adjacent to the first control point.

At (S1230), a plurality of candidate reference templates is determined in a reference picture for the current template associated with the first control point.

At (S1240), a reference template is determined from the plurality of candidate reference templates for the current template associated with the first control point based on TM costs that indicate differences between each of the plurality of candidate reference templates and the current template of the first control point. In an example, the determination of the reference template may include a selection of the reference template from the plurality of candidate reference templates for the current template associated with the first control point based on TM costs that indicate differences between each of the plurality of candidate reference templates and the current template of the first control point.

At (S1250), a first CPMV is determined based on the determined reference template, where the first CPMV indicates an offset between the determined reference template in the reference picture and the current template associated with the first control point.

At (S1260), the current block is encoded based at least on the first CPMV.

Then, the process proceeds to (S1299) and terminates.

The process (1200) can be suitably adapted. Step(s) in the process (1200) can be modified and/or omitted. Additional step(s) can be added. Any suitable order of implementation can be used.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
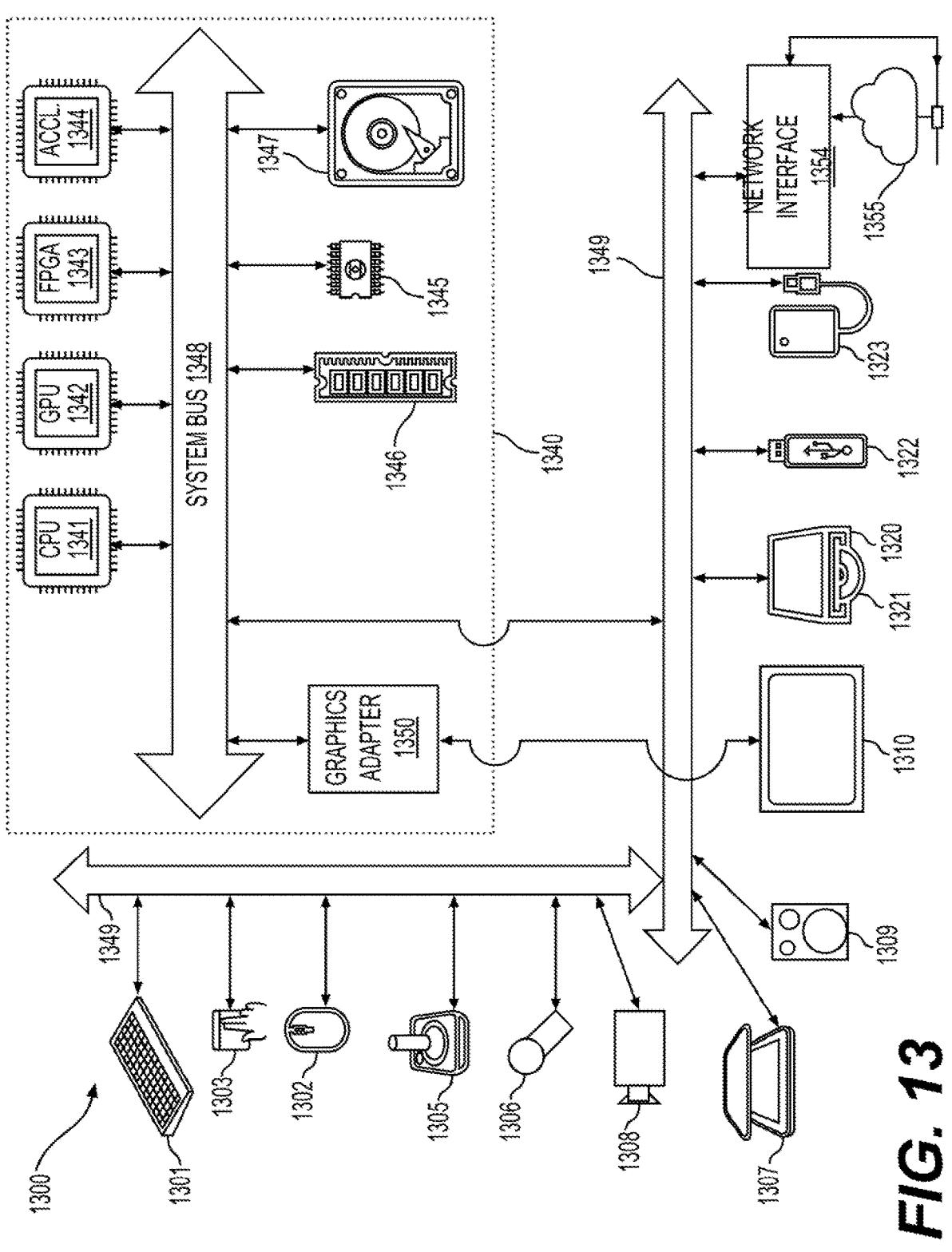
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hard-wired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, the method comprising:
receiving a video bitstream comprising a current block in a current picture, the current block being coded in an affine mode in which a first control point associated with the affine mode is positioned at a first corner of the current block;
determining a current template associated with the first control point, the current template (i) being adjacent to the first corner of the current block and (ii) having an above template portion with a width that is less than a width of the current block and a left template portion with a height that is less than a height of the current block;
determining a plurality of candidate reference templates in a reference picture for the current template associated with the first control point;
selecting a reference template from the plurality of candidate reference templates for the current template associated with the first control point based on a template matching (TM) cost that indicates a respective difference between each candidate reference template and the current template of the first control point;
determining a first control point motion vector (CPMV) based on the selected reference template, the first CPMV indicating an offset between the selected reference template in the reference picture and the current template associated with the first control point; and
reconstructing the current block based at least on the first CPMV.

2. The method of claim 1, wherein the determining the current template associated with the first control point further comprises:
determining a first block such that the first control point is positioned at a center of the first block; and
determining the current template associated with the first control point as a reconstructed region that is positioned at one or a combination of (i) a top side of the first block and (ii) a left side of the first block.

3. The method of claim 1, wherein the determining the current template associated with the first control point further comprises:
determining the current template associated with the first control point as a reconstructed region that is adjacent to the first control point and includes at least one of (i) a first region at a top side of the current block or (ii) a second region at a left side of the current block.

4. The method of claim 1, wherein the determining the current template associated with the first control point further comprises:
determining the current template associated with the first control point as a reconstructed region in which the first control point is a center of the reconstructed region, the reconstructed region including at least one of (i) a first region that is positioned at a top side of the current block and further extends beyond a vertical side of the current block, and (ii) a second region that is positioned at a left side of the current block and further extends beyond a horizontal side of the current block.

5. The method of claim 3, wherein:
the first region includes a height equal to N samples and a width equal to a width of an affine subblock of the current block, and
the second region includes a width equal to N samples and a height equal to a height of the affine subblock of the current block, N being a positive integer.

6. The method of claim 1, wherein the determining the plurality of candidate reference templates in the reference picture further comprises:
determining an initial first CPMV for the first control point, the initial first CPMV indicating an initial reference template in the reference picture; and
determining the plurality of candidate reference templates within a search range of the initial reference template, the search range including M×M pixels, M being less than 8.

7. The method of claim 6, wherein the determining the plurality of candidate reference templates within the search range of the initial reference template further comprises:
determining the plurality of candidate reference templates within the search range of the initial reference template based on a plurality of search steps, a number of the plurality of search steps being determined based on one of a predefined resolution and a predefined number.

8. The method of claim 1, wherein the selecting the reference template from the plurality of candidate reference templates further comprises:
determining the TM costs between the current template associated with the first control point and each of the plurality of candidate reference templates; and
selecting the reference template from the plurality of candidate reference templates that corresponds to a minimum TM cost among the determined TM costs between the current template associated with the first control point and each of the plurality of candidate reference templates.

9. The method of claim 1, wherein the selecting the reference template from the plurality of candidate reference templates further comprises:
determining a template of the current block that includes a first region at a top side of the current block and a second region at a left side of the current block;
determining a first candidate CPMV for the first control point based on a first candidate reference template of the plurality of candidate reference templates and a second candidate CPMV for the first control point based on a second candidate reference template of the plurality of candidate reference templates;
determining a first set of subblock affine MVs for subblocks of the current block that are adjacent to the template of the current block based at least on the first candidate CPMV and a second set of subblock affine MVs for the subblocks of the current block that are adjacent to the template of the current block based at least on the second candidate CPMV;
determining a first set of reference subblock affine MVs for subblocks of a collocated block of the current block that corresponds to the first set of subblock affine MVs and a second set of reference subblock affine MVs for the subblocks of the collocated block of the current block that corresponds to the second set of subblock affine MVs;

determining a first reference template based on the first set of reference subblock affine MVs and a second reference template based on the second set of reference subblock affine MVs;

determining a first TM cost between the template of the current block and the first reference template and a second TM cost between the template of the current block and the second reference template; and selecting one of the first candidate reference template and the second candidate reference template as the reference template, the one of the first candidate reference template and the second candidate reference template corresponding to a smaller one of the first TM cost and the second TM cost.

10. The method of claim 9, wherein the determining the first reference template based on the first set of reference subblock affine MVs further comprises:

determining a reference subblock for each of the subblocks of the collocated block based on a respective one of the first set of reference subblock affine MVs;

determining a subblock template for each of the reference subblocks for the subblocks of the collocated block; and determining the first reference template as a combination of the subblock templates.

11. The method of claim 1, wherein the affine mode includes one of an affine uni-prediction mode and an affine bi-prediction mode.

12. The method of claim 1, wherein:

the current block includes a second control point at a second corner of the current block, and the method further comprising:

determining an initial second CPMV for the second control point; and determining a second CPMV for the second control point by adding a translation MV offset to the initial second CPMV, the translation MV offset being derived based on decoder side motion vector refinement (DMVR).

13. A method of video encoding, the method comprising:

determining a current block in a current picture to be coded in an affine mode in which a first control point associated with the affine mode is positioned at a first corner of the current block;

determining a current template associated with the first control point, the current template (i) being adjacent to the first corner of the current block and (ii) having an above template portion with a width that is less than a width of the current block and a left template portion with a height that is less than a height of the current block;

determining a plurality of candidate reference templates in a reference picture for the current template associated with the first control point;

selecting a reference template from the plurality of candidate reference templates for the current template associated with the first control point based on a template matching (TM) cost that indicates a respective difference between each candidate reference template and the current template of the first control point;

determining a first control point motion vector (CPMV) based on the selected reference template, the first CPMV indicating an offset between the selected reference template in the reference picture and the current template associated with the first control point; and encoding the current block into a bitstream based at least on the first CPMV.

14. The method of claim 13, wherein the determining the current template associated with the first control point further comprises:

determining a first block such that the first control point is positioned at a center of the first block; and determining the current template associated with the first control point as a reconstructed region that is positioned at one or a combination of (i) a top side of the first block and (ii) a left side of the first block.

15. The method of claim 13, wherein the determining the current template associated with the first control point further comprises:

determining the current template associated with the first control point as a reconstructed region that is adjacent to the first control point and includes at least one of (i) a first region at a top side of the current block or (ii) a second region at a left side of the current block.

16. The method of claim 13, wherein the determining the current template associated with the first control point further comprises:

determining the current template associated with the first control point as a reconstructed region in which the first control point is a center of the reconstructed region, the reconstructed region including at least one of (i) a first region that is positioned at a top side of the current block and further extends beyond a vertical side of the current block, and (ii) a second region that is positioned at a left side of the current block and further extends beyond a horizontal side of the current block.

17. The method of claim 15, wherein:

the first region includes a height equal to N samples and a width equal to a width of an affine subblock of the current block, and the second region includes a width equal to N samples and a height equal to a height of the affine subblock of the current block, N being a positive integer.

18. The method of claim 13, wherein the determining the plurality of candidate reference templates in the reference picture further comprises:

determining an initial first CPMV for the first control point, the initial first CPMV indicating an initial reference template in the reference picture; and determining the plurality of candidate reference templates within a search range of the initial reference template, the search range including M×M pixels, M being less than 8.

19. The method of claim 18, wherein the determining the plurality of candidate reference templates within the search range of the initial reference template further comprises:

determining the plurality of candidate reference templates within the search range of the initial reference template based on a plurality of search steps, a number of the plurality of search steps being determined based on one of a predefined resolution and a predefined number.

20. A non-transitory computer-readable storage medium storing instructions which when executed by a processor cause the processor to perform an encoding method comprising:

determining a current block in a current picture to be coded in an affine mode in which a first control point associated with the affine mode is positioned at a first corner of the current block;

determining a current template associated with the first control point, the current template (i) being adjacent to the first corner of the current block and (ii) having an above template portion with a width that is less than a width of the current block and a left template portion with a height that is less than a height of the current block;

determining a plurality of candidate reference templates in a reference picture for the current template associated with the first control point;

selecting a reference template from the plurality of candidate reference templates for the current template associated with the first control point based on a template matching (TM) cost that indicates a respective difference between each candidate reference template and the current template of the first control point;

determining a first control point motion vector (CPMV) based on the selected reference template, the first CPMV indicating an offset between the selected reference template in the reference picture and the current template associated with the first control point;

encoding the current block into a bitstream based at least on the first CPMV; and transmitting the encoded bitstream.

* * * * *